July 17, 1962  C. H. HERR, JR  3,044,595

FLUID OPERATED CLUTCH

Filed Feb. 18, 1960

Inventor
Charles H. Herr, Jr.
By
Attorney

United States Patent Office 3,044,595
Patented July 17, 1962

3,044,595
FLUID OPERATED CLUTCH
Charles H. Herr, Jr., Springfield, Ill., assignor to Allis-Chalmers Manufacturing Company, Milwaukee, Wis.
Filed Feb. 18, 1960, Ser. No. 9,517
10 Claims. (Cl. 192—87)

This invention relates generally to fluid actuated clutch devices and is more particularly concerned with a double acting hydraulically actuated clutch mechanism.

Present day hydraulically operated clutches which are adapted to be incorporated into quick shift transmissions are controlled by valves which are remote from the clutch assembly. These remote valves are operative to selectively channel pressurized fluid from the pump to pressurize a hydraulic actuator that in turn engages the clutch. This engaging cycle is accompanied by an uncertain time lag between manually moving the control lever of the valve and the actual clutch engagement. Obviously this element of uncertainty in operation is undesirable as it prevents the operator from "feeling" the clutch into full engagement.

Without adequate "feel" it is very difficult to achieve a smooth, positive clutch operation, the consequence being that clutch parts and associated gearing are subjected to sudden shock loads during clutch engagement. Also, without proper "feel" it is very difficult for the operator to ease the clutch into a heavy load or to only partially use the torque capacity of the clutch.

It is, therefore, an object of the present invention to provide an actuating mechanism for a fluid operated clutch which will give the operator a "feel" and enable him to partially engage the clutch or to use the full torque capacity of the clutch as desired.

It is also another object of this invention to provide an improved fluid operated clutch mechanism wherein the operator is furnished with sense of "feel" that assures a smooth cushioned engagement of the clutch without sacrificing speed of operation.

It is a further object of the present invention to provide a fluid operated clutch with a follow-up control valving arrangement.

Figure 1:
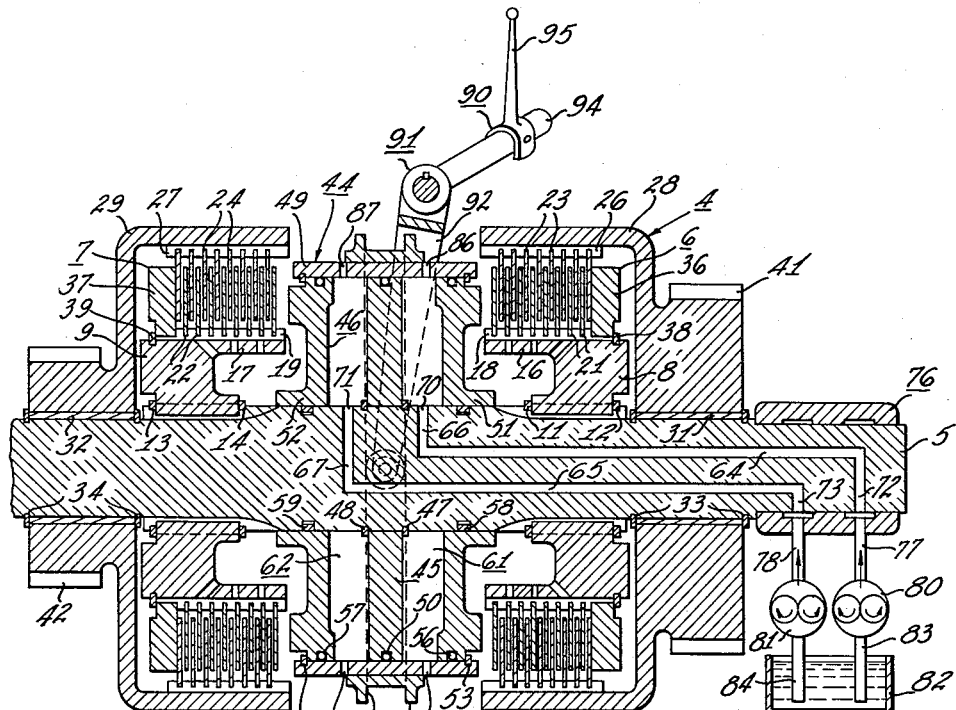
Figure 2:
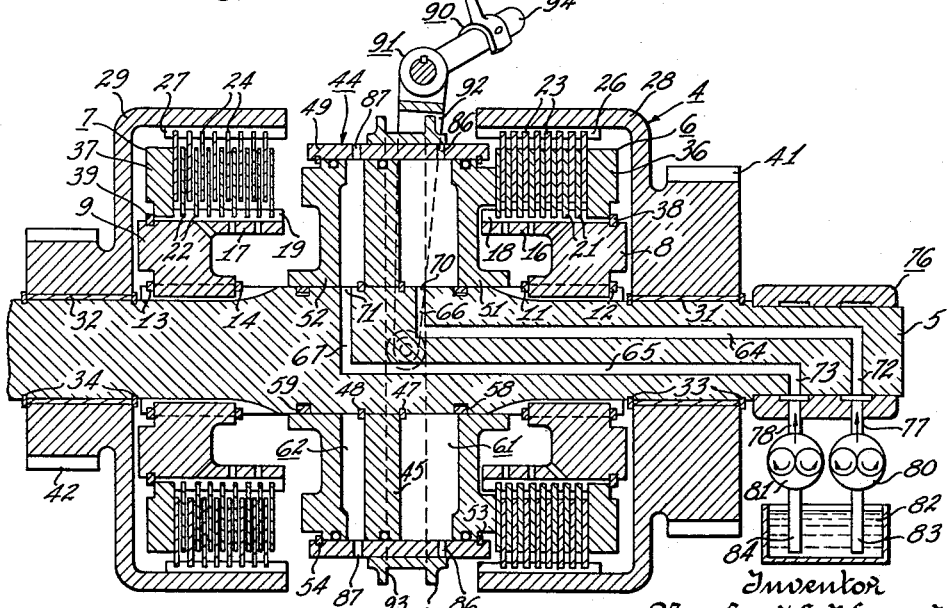

Other objects and advantages of the present invention will be readily apparent to those skilled in the art when the following detailed description is read in conjunction with the appended drawings in which:

FIG. 1 is a longitudinal section view of the fluid operated double acting clutch mechanism showing the flow control valving in the neutral or midposition and the actuator assembly in a corresponding midposition out of engagement with either of the pair of spaced clutch means; also shown is a diagrammatic illustration of a hydraulic pressure source for supplying pressurized fluid to the clutch; and FIG. 2 shows the clutch mechanism of FIG. 1 with the flow control valving shifted to the right into an operating position and with the actuator assembly shifted to the right to fully engage the adjacent clutch means.

Referring to FIG. 1, the double acting clutch mechanism 4 which is illustrated is of a type adapted to be incorporated into the transmission of a tractor type vehicle, not shown. A rotatable transmission or drive shaft 5 is adapted to be connected through suitable torque transmitting means, not shown, to the propelling motor of the vehicle. A pair of clutch means 6 and 7 is carried on shaft 5 in axially spaced relationship from each other. The clutch means 6 and 7, respectively, include driving hubs 8 and 9 splined on shaft 5. Hubs 8 and 9 are respectively retained against axial movement by snap rings 11 and 12 and snap rings 13 and 14, respectively. Hubs 8 and 9, respectively, include an axially extending annular portion 16 and 17, the respective outer peripheries of the latter are provided with a series of axially extending splines 18 and 19. The splines 18 and 19, respectively, of annular portions 16 and 17 are adapted to engage complementary teeth which are provided on the radially inner portion respectively of sets of driving clutch disks 21 and 22. Sets of disks 21 and sets 22 are axially slidable and alternately stacked respectively with sets of driven disks 23 and 24 in the well known manner common to multiple disk clutch assemblies.

Driven disk sets 23 and 24, respectively, are also axially slidably mounted and have teeth formed at their outer radial edge that are engaged with complementary splines 26 and 27 formed on the inner annular surfaces of a pair of driven clutch drums 28 and 29. Drums 28 and 29 are rotatably carried respectively on shaft 5 by means of suitable bearings 31 and 32 and are respectively held against axial displacement on shaft 5 by means of pairs of snap rings 33 and 34.

Also carried on each of the driving hubs 8 and 9 are annular backing members 36 and 37 which are respectively mounted in splined engagement with splines 18 and 19 of annular portions 16 and 17. Backing members 36 and 37, respectively, are held against outward axial movement by means of snap rings 38 and 39. Members 36 and 37 serve in the well known manner as abutments for the respective stacks of disks during engagement of the clutch means.

A gear 41 is formed integral with the driven drum 28 of clutch means 6, and a gear 42 is integral with the driven drum 29 of clutch means 7. Gears 41 and 42 are adapted to be in constant mesh with other gears, not shown, of a transmission. It will be readily apparent from the foregoing that sets of disks 21 and 23 form a clutch stack and upon compression of this clutch stack, gear 41 will be connected in driving relationship with shaft 5; and likewise if the clutch stack formed by disks 22 and 24 is compressed, gear 42 will be connected for rotation with the transmission shaft 5.

To bring about compression of the respective clutch stacks an actuator means 44 is positioned between the clutch means 6 and 7. Actuator means 44 includes a radially disposed reaction or fixed piston member 45 that is carried on shaft 5 and prevented from axial movement in either direction by means of snap rings 47 and 48. Spanning fixed piston 45 is a cylinder assembly 46 including cylinder or sleeve 49 and a pair of annular piston members 51 and 52 fitted inside of sleeve 49 and held therein against outward axial movement by means of retaining rings 53 and 54. Piston 45 is sealed to sleeve 49 by means of a packing ring 50 carried in an annular groove in the outer peripheral surface of the piston. Pistons 51 and 52 are sealed to sleeve 49 by means of packing rings 56 and 57 carried by the pistons, respectively, and sealed to the shaft surface by means of piston rings 58 and 59 carried in suitable annular grooves formed in shaft 5.

It will be readily apparent that the reaction of fixed piston member 45 coacts with sleeve 49 and with the piston means 51 and 52 to form a pair of pressure chambers 61 and 62, respectively, at each end of the actuator means 44. Also, it will be apparent that piston members 51 and 52 in effect form a radially disposed closure at opposite ends of the sleeve 49 and that upon the shifting of cylinder assembly 46 to the right, piston member 51 is engageable with clutch means 6 and upon shifting of cylinder assembly 46 to the left, piston 52 is engageable with clutch means 7.

To bring about this shifting hydraulic pressure is selectively built up in one or the other of the chambers 61 and 62. Pressure fluid enters chambers 61 and 62, respectively, by means of a pair of elongated bores 64 and 65 formed within and extending longitudinally of shaft 5. Bores 64 and 65 are connected respectively by means of transverse bores 66 and 67 to the inlet ports 70 and 71, respectively, of pressure chambers 61 and 62. The other ends of the bores 64 and 65 are connected respectively by means of transverse bores 72 and 73 to the inlet chambers of a collector ring assembly 76 which is carried on shaft 5 in a conventional manner. The inlet chambers of collector ring assembly 76 are respectively connected by suitable conduits 77 and 78 to a pair of pumps 80 and 81 which in turn respectively draw hydraulic fluid from a reservoir 82 through suitable inlet conduits 83 and 84.

To control the pressure build-up within the pressure chambers a valve means is provided which includes a plurality of outlet ports 86 formed in and spaced circumferentially about sleeve 49 and through which hydraulic fluid from pressure chamber 61 is discharged; and another plurality of outlet ports 87 axially spaced from ports 86 and likewise formed in and spaced circumferentially about the sleeve 49 through which hydraulic fluid from chamber 62 is discharged. To control the discharge from outlet ports 86 and 87 a flow control valve means is provided which comprises an annular collar 89 that is coaxially aligned with and slidably mounted on the outer circumferential surface of sleeve 49 and is positioned between ports 86 and 87. Collar 89 is controlled by a shifter means 90 which comprises a yoke member 91 having a pair of arms 92 (only one of which is partially shown) that are received in an annular groove 93 of annular collar 89. The shifter means also includes a rock shaft 94 that is journaled by suitable bearing means on a support such as the transmission housing, not shown, and upon which yoke 91 is keyed; and a hand lever 95 that is connected to shaft 94 and is adapted to rotate the latter in order to pivot yoke 91 and thereby axially slide collar 89 into flow restricting relationship with ports 86 and 87 alternatively. Since the coaction of a yoke and shiftable collar is well understood in the art, this structure has not been shown or described in detail. It should also be understood that it is not intended to limit this invention to the particular details of the yoke and shifter means as any suitable linkage means may be employed to axially shift collar 89.

In the disclosed embodiment of FIG. 1 it will be apparent that collar member 89 actually serves as a valve member and is of such a width that it slightly overlaps the outlet ports 86 and 87 when disposed in the normal or midposition. Since outlet ports 86 and 87 are formed as round drilled holes, by overlapping a portion of the round openings it is possible to initially obtain a greater restriction of fluid flow with the minimum amount of axial shifting of collar member 89 out of the midposition. It will be readily apparent that this is so since more of the flow area of the outlet port would be restricted or blocked as the edge of collar 89 nears the center of the round openings. It is to be understood, however, that it is not intended to limit this invention to the shape of the outlet ports or the particular overlapping position of collar 89 with respect to the outlet ports.

From the foregoing it will be apparent that pumps 80 and 81 provide a source of constant pressure and that conduits 77 and 78, collector ring assembly 76, bores 72 and 73, 64 and 65, and 66 and 67 comprise a flow path defining means through which pressurized fluid is delivered to chambers 61 and 62. This invention can also be carried out by using a single high output pump as a source of constant pressure for the pressure chambers. In a one pump arrangement, however, it would be necessary to provide some means to insure substantially equal fluid flow to each pressure chamber. It would also be necessary to insure that a pressure unbalance occurs when the outlet ports of one of the chambers are blocked. One way to insure an unbalance is to design the ports so that the total outlet area of the outlet ports in each pressure chamber is greater than the total area of the inlet ports for each of the pressure chambers.

When collar 89 is centered, the pressure acting in each of the chambers 61 and 62 will tend to equalize and automatically center the cylinder assembly 46. It is not intended, however, to limit the invention exclusively to pressure centering since spring means, not shown, may be employed to assist in centering the cylinder assembly 46 in a midposition. For instance, compression spring means, not shown, could be so positioned as to react between the reaction member 45 and each of the pistons 51 and 52 in order to yieldably maintain the assembly 46 in the centered position and out of engagement with each of the clutch means 6 and 7.

*Operation*

This type of double acting clutch may be thought of as incorporating a dynamic flow principle in that during operation of the hydraulic system a continuous flow of hydraulic fluid is provided by pumps 80 and 81, and this fluid is continuously being discharged from either one or both outlet ports 86 and 87.

Referring to FIG. 1, during neutral operation of the clutch assembly, collar 89 is disposed in the midposition and sleeve 49 is maintained in a corresponding intermediate position, and pistons 51 and 52 are out of engagement with the disks of clutch means 6 and 7. This, of course, is due to the fact that the flow area of ports 86 and 87 will be approximately equal and consequently the pressure within actuator chambers 61 and 62 will be substantially balanced.

When it is desired to engage clutch means 6, for instance, hand lever 95 is pivoted to the left as viewed in FIG. 1 which in turn rocks shaft 94 to the left pivoting yoke 91 to the right and causing collar 89 to be shifted to the right independently of cylinder assembly 46 and into flow restricting relationship to outlet ports 86. It will be obvious that upon restriction of flow from ports 86 the pressure will build up in actuator chamber 61 causing expansion of chamber 61 and thereby shifting the cylinder assembly 46 to the right. This rightward movement of assembly 46 is with respect to collar 89 and will continue only until the outlet ports 86 are uncovered sufficiently to drop the pressure in chamber 61 to where it will again be in balance with the pressure in chamber 62. Therefore, to effect a continuous rightward movement of the sleeve 49 and piston 51 in order to fully compress the clutch disks 21 and 23, collar 89 must also be simultaneously shifted to the right to maintain flow restricting relationship with outlet ports 86. A continuous pressure build-up will be created in chamber 61 and subsequently piston 51 will be displaced to the right a sufficient distance to transmit compressive force to the sets of clutch disks 21 and 23 in order to fully engage clutch means 6, as shown for instance in FIG. 2.

Referring to FIG. 2, the annular collar 89 is shifted to the extreme right into flow restricting relationship to outlet ports 86 and the cylinder assembly 46 is also shifted to the extreme right with piston member 51 having fully compressed disks 21 and 23 into frictional engagement with each other. As shown in FIG. 2, a direct drive has thus been established between shaft 5 and gear 41 on the driven drum 28. In explaining the actuation of the clutch from the neutral position of FIG. 1 to the fully engaged position, as shown in FIG. 2, it may seem that a series of very abrupt movements of collar 89 are required in order to achieve full engagement of the clutch means 6. In operation, however, a smooth positive engagement of either clutch means 6 or 7 can be accomplished by a steady movement of the control lever 95.

Considering this shifting operation from the general point of view it will be apparent that any movement of collar 89 in either direction is duplicated by the cylinder assembly 46 and that this arrangement of collar 89 between outlet ports 86 and 87 actually provides a follow-up flow control valving. This follow-up feature will, of course, give the operator a keen sense of feel and when actuating either of the clutch means 6 or 7 he can ease the cylinder assembly into compressive relationship with the clutch disks in order that a cushioned engagement of the clutch means can be accomplished. That is, engagement of the clutch can be accomplished without subjecting the parts to sudden shock loads. Further, this type of hydraulic actuator will provide instantaneous response to the slightest adjustment of collar 89 thereby avoiding the uncertain time lag between moving the manual control lever and in the actual engagement of the clutch.

From the foregoing detailed description it will be readily apparent to those skilled in the art that a new and useful double acting hydraulic clutch mechanism has been illustrated which provides a follow-up feature giving the operator a sense of feel so that either of the clutch means 6 or 7 may be engaged smoothly and positively.

This follow-up feature also permits the operator to use any portion of the torque capacity of the clutch since he can very precisely control the amount of pressure build-up in either of the pressure chambers by simply partially blocking the appropriate outlet ports.

It is to be understood that although only one embodiment of the invention has been shown and described in detail it is not intended to limit the patent granted hereon otherwise than is necessitated by the scope of he appended claims.

What is claimed is:

1. In a fluid operated clutch mechanism, a pair of friction clutch means, an axially slidable cylinder, a piston means carried within and disposed at opposite ends of said cylinder and being movable therewith, said piston means being operative respectively to engage said pair of clutch means, reaction means in said cylinder defining a pressure chamber with said piston means and cylinder, an inlet port for said pressure chambers adapted to be connected to a source of fluid pressure, an outlet port in the periphery of said cylinder for exhausting fluid from each of said pair of pressure chambers, and manually operated flow control means including an annular valve member axially slidably carried on the outer circumferential surface of said cylinder for selectively restricting the flow of fluid from said outlet ports, said annular valve member having a first position allowing substantially equal fluid flow from said outlet ports, and said annular valve member being movable out of said first position in one axial direction into flow restricting relation to one of said outlet ports causing expansion of the corresponding pressure chamber and moving said cylinder and piston means in said one axial direction with respect to said valve member and forcing one of said piston means into engagement with one of said clutch means.

2. In a fluid operated clutch mechanism mounted on a rotatable shaft, a pair of spaced friction clutch means, an annular cylinder coaxial with said shaft and disposed intermediate said clutch means, spaced piston means respectively carried within and disposed at opposite ends of said cylinder and being movable therewith into engagement with the adjacent clutch means respectively, a reaction means carried on said shaft in axially fixed relationship therewith and coacting with said cylinder to define a pressure chamber for each of said piston means, an inlet port for each of said pressure chambers, flow path defining means in said shaft adapted to connect said inlet ports to a source of fluid pressure, a first plurality of circumferentially spaced inlet ports in said cylinder for one of said chambers, and a second plurality of circumferentially spaced outlet ports in said cylinders for the other of said pressure chambers, and a flow control means including a valve means axially slidably carried on the outer circumferential surface of said cylinder intermediate said sets of outlet ports for selectively varying the flow of fluid from said sets of outlet ports, and means independent of said cylinder for shifting said valve means in one axial direction to decrease the fluid flow from the outlet ports of one of said chambers causing expansion of said one pressure chamber and moving the cylinder and piston means in said one axial direction with respect to said valve means.

3. In a fluid operated clutch mechanism, a pair of spaced friction clutch means mounted on a shaft that is rotatably mounted on a support, a fixed annular piston member mounted coaxial with said shaft intermediate said clutch means and held against axial movement on the shaft, a cylinder axially slidable on said piston member, a radially disposed closure means at one end of said cylinder being movable therewith to engage one of said clutch means, an annular pressure chamber being defined within said cylinder between said fixed piston and closure means, an inlet port for said pressure chamber adapted to be connected to a source of continuous fluid pressure, an opening in the periphery of said cylinder serving as an outlet port for said chamber, a flow control means including an annular collar axially slidable on the outer circumferential surface of said cylinder for restricting the flow of fluid from said outlet port, and means on said support for controlling axial adjustment of said annular collar independently of said cylinder, adjustment of said annular collar in one axial direction into flow interrupting relationship with said outlet port causes expansion of the pressure chamber forcing said cylinder and closure means in said one axial direction for engaging said one clutch means.

4. In a fluid pressure operated clutch mechanism, a pair of axially spaced friction clutch means, fluid pressure actuator means for alternatively engaging said pair of clutch means, said actuator means comprising an axially movable cylinder assembly having closure means at opposite ends engageable respectively with said clutch means for transmitting compressive force thereto, reaction means defining a pair of pressure chambers with said cylinder assembly, an inlet port for each of said pressure chambers, an outlet port in said cylinder for each of said chambers, and flow control means including a movable valve member for selectively controlling the flow of fluid from said outlet ports, said valve member being adjustable independently of said cylinder assembly and operative to decrease the amount of fluid flow from the outlet port of one of said chambers causing a pressure differential between said pair of pressure chambers forcing said cylinder assembly in one axial direction for engaging one of said clutch means.

5. In a fluid pressure operated clutch mechanism, a pair of axially spaced friction clutch means, fluid pressure actuator means for alternatively engaging said pair of clutch means, said actuator means comprising an axially movable cylinder assembly including a cylinder member having closure means at opposite ends thereof, reaction means defining a pair of pressure chambers with said cylinder assembly, an inlet port for each of said pressure chambers, an outlet port in said cylinder member for each of said chambers, and flow control means including a movable valve member adjustable independently of said cylinder member for selectively restricting the flow of fluid from said outlet ports, restriction of flow from the outlet port of one of said chambers causes a pressure differential between said pair of pressure chambers thereby forcing the cylinder assembly in one axial direction with respect to said valve member.

6. In a fluid operated clutch mechanism, friction clutch means, an axially slidable cylinder assembly including a cylinder member and a closure means disposed radially at one end of said cylinder member, said closure means being engageable with said clutch means, reaction means in said cylinder assembly defining a pressure chamber with said closure means and cylinder member, an inlet port for said pressure chamber adapted to be connected to a source of fluid pressure, an outlet port in the periphery of said cylinder member for exhausting fluid from said pressure chamber, and manually operated flow control means including an annular valve member axially slidably carried on the outer circumferential surface of said cylinder member, said valve member being axially adjustable independently of said cylinder for restricting the flow of fluid from said outlet port, said valve member having a first position whereby fluid is allowed to flow from said outlet port, and said valve member being movable in one axial direction out of said first position into flow restricting relation to said outlet port causing expansion of said pressure chamber moving said cylinder in said one axial direction with respect to said valve member, continuous movement of said valve member in said one axial direction to maintain flow restriction to said outlet port actuates said clutch means.

7. In a fluid operated clutch mechanism, a pair of spaced friction clutch means, an actuator means intermediate said clutch means, said actuator means including an axially movable cylinder, closure means disposed at opposite ends of said cylinder, said closure means being alternatively engageable with said pair of clutch means, respectively, upon axial movement of said cylinder, reaction means in said cylinder defining a pair of pressure chambers respectively at opposite ends of said cylinder, an inlet port for each of said pressure chambers, an outlet port in the periphery of said cylinder for each of said chambers, and flow control means including a valve member axially slidably carried on the outer circumferential surface of said cylinder for selectively varying the flow of fluid from said outlet ports, shifter means for axially shifting said closure member independently of said cylinder, shifting of said valve member in one axial direction into flow restricting relationship to the outlet port of one of said pressure chambers causes a pressure differential between said pressure chambers moving said cylinder in said one axial direction with respect to said valve member and actuates one of said clutch means.

8. The combination set forth in claim 7 wherein said outlet ports are spaced axially of said cylinder and said valve member being positioned between said outlet ports.

9. The combination set forth in claim 8 wherein said closure member has a midposition permitting balanced fluid flow from said outlet ports, and wherein said valve member is selectively shiftable in opposite axial directions by said shifter means into flow restricting relationship with said outlet ports.

10. In a fluid operated clutch mechanism mounted on a rotatable shaft, a pair of spaced friction clutch means, an annular cylinder coaxial with said shaft and disposed intermediate said clutch means, closure means respectively at opposite ends of said cylinder and being engageable respectively with the adjacent clutch means, a radially disposed reaction means carried on said shaft in axially fixed relationship and coacting with said shaft cylinder and closure means to define an annular pressure chamber at opposite axial sides of said reaction means, an inlet port for each of said pressure chambers, flow path defining means in said shaft adapted to connect said inlet ports to a source of fluid pressure, a first plurality of circumferentially spaced outlet ports in said cylinder for one of said chambers, a second plurality of circumferentially spaced outlet ports in said cylinders for the other of said pressure chambers, and a flow control means including an annular collar axially slidably carried on the outer circumferential surface of said cylinder and positioned between said first and second outlet ports, for selectively varying fluid flow therefrom, and means for shifting said collar independently of said cylinder in one axial direction to interrupt fluid flow from the outlet ports of one of said chambers thereby causing expansion of said one pressure chamber and moving the cylinder in said one axial direction with respect to said collar.

References Cited in the file of this patent
UNITED STATES PATENTS

| | | |
|---|---|---|
| 918,652 | Bryan | Apr. 20, 1909 |
| 1,792,093 | Holmes | Feb. 10, 1931 |
| 1,805,081 | Drkal | May 12, 1931 |
| 2,207,538 | Gaddoni | July 9, 1940 |
| 2,328,273 | Hale | Aug. 31, 1943 |
| 2,876,881 | Parrett | Mar. 10, 1959 |